United States Patent Office 2,969,646
Patented Jan. 31, 1961

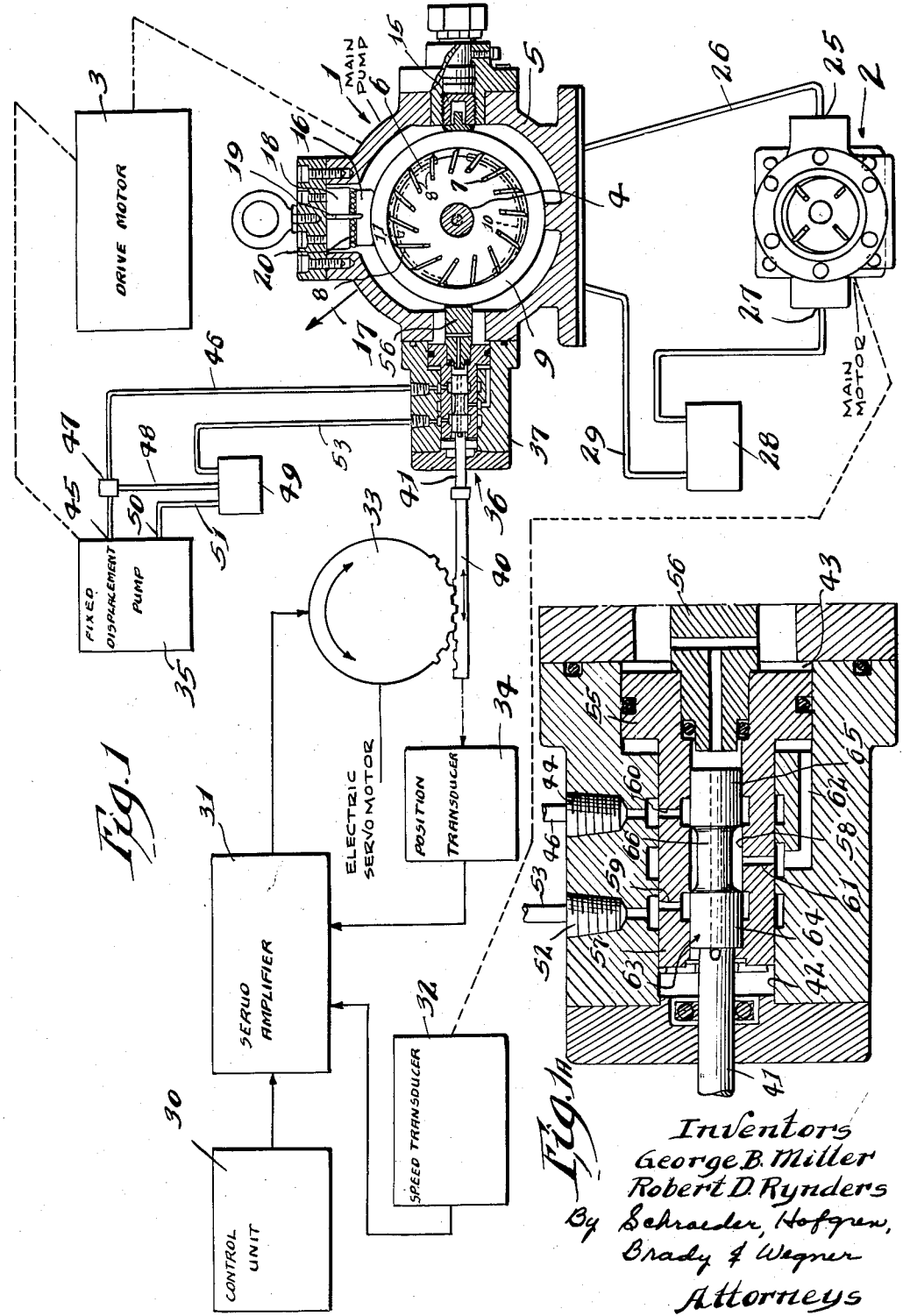

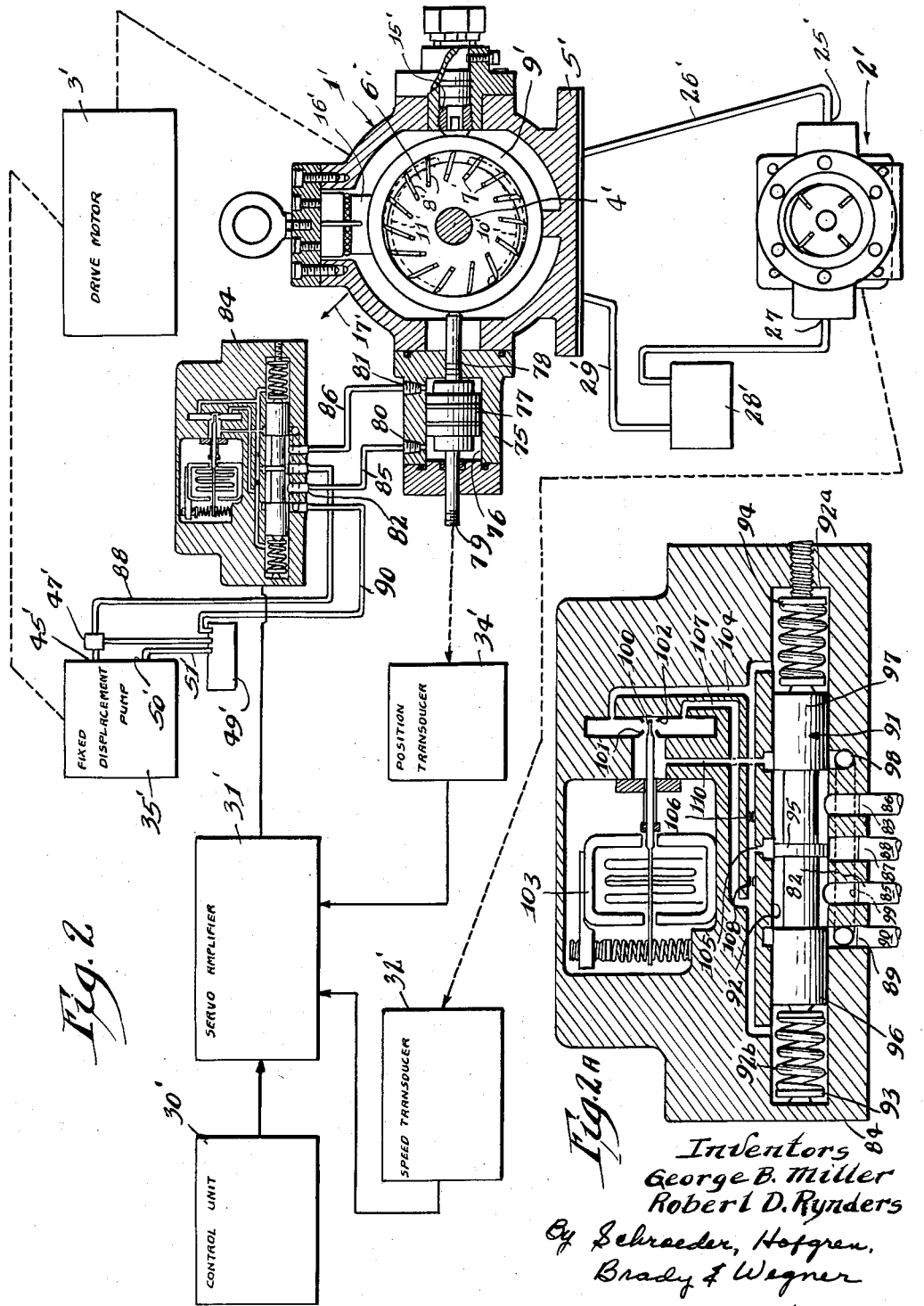

2,969,646

VARIABLE VOLUME PUMP HYDRAULIC TRANSMISSION

George B. Miller and Robert D. Rynders, Racine, Wis., assignors to Racine Hydraulics & Machinery, Inc., a corporation of Wisconsin Filed Jan. 11, 1957, Ser. No. 633,631

5 Claims. (Cl. 60—53)

This invention relates to a hydraulic transmission, and more particularly to a servo-controlled, constant-speed hydraulic system.

An object of this invention is to provide a constant-speed hydraulic system having a variable volume pump and a member moved by the output volume of the pump, whereby the system is independent of changes due to variable pressures and temperatures in the pump, the member, and the hydraulic parts of a control for the pump within the limits desirable to regulate the system.

Another object of the invention is to provide a variable-volume, vane-type pump for driving a driven member with a control for the output volume of the pump to provide and maintain a desired speed of the driven member.

Another object of the invention is to provide a hydraulic transmission having a variable-volume, vane-type pump in which the output volume thereof may be controlled to drive a member at a fixed speed or at a variable series of fixed speeds.

A further object of the invention is to provide a hydraulic transmission comprising a variable-volume pump including a shiftable device for varying the output volume of the pump, a source of operating fluid under pressure, a member in engagement with the shiftable device in opposing relation to the force of pumping action in said pump, a cylinder having a movable piston for positioning the member, a valve including a valve member connected to the cylinder for directing said fluid to said piston, a pilot valve associated with the first-mentioned valve, and servo-controlled means for positioning the pilot valve.

The objects of the invention generally set forth, together with other ancillary advantages, are attained by the construction and arrangement shown by way of illustration in the accompanying drawing, in which:

Fig. 1 is a schematic view of an embodiment of the hydraulic transmission with the pump and a portion of the control associated therewith shown in vertical section;

Fig. 1A is a sectional view on an enlarged scale of the part of the control attached to the variable-volume pump casing;

Fig. 2 is a schematic view, similar to Fig. 1, of a preferred embodiment of the invention; and Fig. 2A is a sectional view on an enlarged scale of the control valve mechanism shown in Fig. 2.

While this invention is susceptible of embodiment in many different forms, there is shown in the drawings and will herein be described in detail a preferred embodiment of the invention and a modification thereof with the understanding that the present disclosure is to be considered as an exemplification of the principles of the invention and is not intended to limit the invention to the embodiment illustrated. The scope of the invention will be pointed out in the appended claims.

An embodiment of the transmission, as shown in Figs. 1 and 1A, comprises a variable-volume, vane-type main pump indicated generally at 1, a main motor indicated generally at 2 driven by the output of the pump 1 which, as shown, is a vane-type motor, although the motor could be of different types and includes a piston and cylinder. A drive motor 3 is provided for driving a rotor shaft 4 of the pump 1. The hydraulic transmission further comprises a control for the output volume of the pump 1, as described in more detail hereinafter.

The main pump 1 comprises a casing 5 in which the rotor shaft 4 is rotatably mounted. A rotor 6 is mounted on the rotor shaft 4 for rotation therewith and has a series of slots 7, each of which carries a slidably mounted vane 8 which is controlled in its sliding movement by a pressure ring 9. A port plate having an elongated, arcuate suction port 10 and an elongated, arcuate pressure port 11 is associated with the rotor and vanes. The pressure ring 9 is mounted for adjustment relative to the rotor shaft 4 so as to vary the eccentricity of the ring relative to the rotor, and an adjustable plunger 15 is provided for determining the maximum eccentricity of the ring 9 relative to the rotor 6. The amount of eccentricity determines the output volume of the pump. A thrust aligning block 16 is provided to partially oppose the thrust of the pressure ring 9. With the rotor shaft 4 rotating in a counter-clockwise direction, the pumping action will result in exerting a thrust in the general direction indicated by the arrow 17. The block 16 is held to a fixed block 18 by a clip 19, and the block 16 may move relative to the fixed block 18 because of rollers 20 mounted therebetween.

The pressure port 11 in the port plate is connected to an input port 25 of the motor 2 by a line 26, and an output port 27 of the motor 2 leads to a reservoir 28 which holds a source of operating fluid. A line 29 extends from the reservoir to the suction port 10 in the port plate.

The control for the pump 1 comprises a control unit 30, a servo-amplifier 31, a speed transducer 32 for the motor 2, a force motor 33, identified in the drawings as an electric servomotor, a position transducer 34, hydraulic components including a fixed displacement pump 35 which may be driven from the motor 3, and hydraulic mechanism indicated generally at 36 mounted in a housing 37 suitably secured to the casing 5 of the pump 1.

The control unit is a device for producing an output voltage which may be a constant voltage source, such as a battery, when it is desired to maintain a single, fixed speed of the motor 2. If a variable series of fixed speeds or variable speeds are desired, the control unit may be automatic by a cam controlled potentiometer or a wave-form generator. The speed control may be done manually by a potentiometer control.

The servo-amplifier 31 has suitable circuits to receive and amplify the voltage signal from the control unit 30 and compare this with a main feedback coming from the speed transducer 32 which may be in the form of a D.-C. tachometer generator driven from the output shaft of the motor 2. The servo-amplifier 31 also takes a feedback from the position transducer 34 which indicates a rate of change in the mechanism controlling the output of the variable-volume pump and dampens the output from the servo-amplifier so as to avoid hunting in the control. The output from the servo-amplifier is transmitted to the force motor 33 which may be a synchronous motor in which its position is determined by the input voltage, and the rate of movement determined by the signal amplitude. The force motor 33 operates to move an actuating rod 40 which connects to a pilot valve stem 41 and also coacts with the position transducer 34. The foregoing inputs and outputs are shown by lines in Fig. 1 with the direction thereof indicated.

The hydraulic mechanism 36 includes the housing 37 having a chamber 42 and a coaxial cylinder section 43. The housing 37 has a fluid pressure port 44 which is connected to an output 45 of the fixed displacement pump by a line 46 which includes a relief valve 47 having a line 48 leading to a reservoir 49. An inlet 50 for the pump 35 has a line 51 extending into the reservoir 49. A drain port 52 in the housing 37 communicates with the reservoir 49 by a line 53. The pressure port 44 and the drain port 52 extend through the wall of the housing 37 so as to communicate with the chamber 42.

The cylinder section 43 of the housing has a piston 55 slidable therein to which a pressure ring engaging member 56 is attached. A sleeve valve 57 formed integrally with the piston 55 is slidably mounted in the housing chamber 42 and has a bore 58 and a pair of passages 59 and 60 which connect the drain port 52 and the pressure port 44, respectively, with the sleeve valve bore 58. An opposed passage 61, through the wall of the sleeve valve, connects the sleeve valve bore 58 with a fluid passage 62 formed in the body of the housing 37 and which connects the housing chamber 42 with the cylinder section 43.

A pilot valve 63 having the valve stem 41 is slidably mounted in the sleeve valve bore 58 and has a pair of lands 64 and 65 with an intermediate grooved section 66. The pilot valve 63 has a neutral position in which, as shown in Fig. 1, the lands 64 and 65 are flush with the edges of passages 59 and 60 in the sleeve valve so as to prevent communication between these passages and the opposed passage 61 which connects with the cylinder section 43. In this neutral position, the ring engaging member 56, piston 55, and sleeve valve 57, all of which are connected together, maintain a fixed position which results in a fixed output volume from the pump 1.

If the motor 2 should fall to a speed below that desired, the member 56 will shift toward the right, as viewed in Fig. 1, so as to increase the output volume of the pump by a corresponding movement of the pressure ring 9. This movement of the member 56 is effected by a signal from the servo-amplifier 31 to the force motor 33 which causes counterclockwise rotation of the force motor to move the rod 40 toward the right, as viewed in Fig. 1, which correspondingly shifts the pilot valve 63 to the right which unblocks the pressure passage 60 to connect the pressure port 44 to the cylinder section 43 through sleeve valve bore 58, opposed passage 61, and fluid passage 62. This results in shifting the piston 55 toward the right a distance which is determined by the coresponding movement of the sleeve valve 57 which moves with the piston and has the passage 60 formed therein. The movement will stop when the passage 60 has traveled to a position where it is again blocked by the pilot valve land 65.

An increase in speed of the motor 2 will result in clockwise rotation of the force motor 33 to shift the pilot valve 63 to the left which uncovers drain passage 59 so as to connect the cylinder section 43 with the drain port 52. This connection to drain permits the thrust of the pumping action in pump 1 to move the ring engaging member 56 to the left until the sleeve valve 57 has moved a distance sufficient to again cause pilot valve land 64 to block the drain passage 59.

The preferred embodiment of the hydraulic transmission is shown in Figs. 2 and 2A and embodies several components which are identical with those shown in Fig. 1, and similar parts have been given a similar reference numeral with a prime affixed thereto.

The embodiment shown in Figs. 2 and 2A distinguishes from the embodiment shown in Fig. 1 primarily in the hydraulic components of the contros for determining the output volume of the pump 1'.

The casing 5' of the pump has a housing 75 secured thereto having a cylinder section 76 in which a piston 77 is movably mounted. The piston 77 has a pressure ring engaging member 78 extending from one end thereof and has a rod 79 extending from the other end and through the housing 75 to coact with the position transducer 34'. The housing 75 has a pair of ports 80 and 81 which are connected to a pair of ports 82 and 83 in a valve body 84 by lines 85 and 86, respectively. An inlet port 87 for the valve body 84 is intermediate the ports 82 and 83 and is connected to the outlet 45' of a fixed displacement pump 35' by a line 88 including a relief valve 47'. A drain port 89 connects to a reservoir 49' by a line 90.

A four-way valve includes the ports 82, 83, 87 and 89 and a valve member 91 slidably mounted in a bore 92 formed in the valve body 84. The valve member 91 is normally maintained in a neutral position by springs 93 and 94 acting against opposite ends of the valve member; and, in this position, a central land 95 clears the pressure port 87, and end lands 96 and 97 block the drain port 89 and an annular chamber 98 connected thereto by a cross passage 99.

A pilot valve for controlling the position of the valve member 91 includes a flapper member 100 which is movable between a pair of orifices 101 and 102 under the control of a motor 103 which receives its signal from the servo-amplifier 31'. The orifice 101 is connected by a passage 104 to an end 92a of the chamber 92 and a passage 105 through an orifice 106. The orifice 102 is connected by a line 107 to an end portion 92b of the chamber 92 beyond the land 96 of the valve member 91 and to the passage 105 through an orifice 108.

In operation with the valve member 91 in neutral position, the piston 77 and ring engaging member 78 will be maintained in a fixed position to maintain the output volume of the pump 1'. If the speed of the motor 2' should decrease, the piston 77 and the ring engaging member 78 are shifted to the right by connecting the pressure port 87 to the port 82 which, through the line 85, directs fluid through the port 80 into the cylinder section 76. The housing port 81 is then connected to drain through the drain chamber 98 in valve body 84 and the cross passage 99. This operation requires the movement of the valve member 91 to the right, as viewed in Figs. 2 and 2A, and this is accomplished by causing the flapper member 101 to move toward the orifice 102 which builds up a pressure in the end chamber section 92b to build up a pressure greater than in the chamber section 92a to create a pressure differential with resultant movement of the valve member 91. The flow through either of the orifices 101 and 102 is continuous from the pressure port 87, the lines 104 or 107, respectively, through the orifices to a line 110 which connects with the drain chamber 98 which is always connected to drain by cross passage 99. Once the motor 2' is at speed, the pilot valve flapper member 100 is in a neutral position so that there is no pressure differential on the ends of the valve member 91.

If the speed of the motor 2' should increase above the desired speed, the piston 77 and the ring engaging member 78 move to the left, as viewed in Fig. 2, and this is accomplished by shifting the valve member 91 toward the left, as viewed in Figs. 2 and 2A, by having the motor 103 move the flapper member toward the orifice 101. Once the motor 2' is at speed, the pilot valve flapper member is in a neutral position.

We claim:

1. In a hydraulic transmission, a variable volume pump having a rotor with a plurality of slidably mounted vanes and an adjustable pressure ring cooperating with the vanes, a source of fluid under pressure, a member engageable with the pressure ring to determine the degree of eccentricity between the ring and rotor, a motor driven by the pump and a fluid connection therebetween, a housing having a chamber and a coaxial cylinder section adjacent the ring, a piston connected to said member and slidable in the cylinder section, a sleeve valve connected to the piston and slidable in said chamber, a fluid pressure port and a drain port formed in the housing and communicating with said chamber, a fluid passage in the housing connecting the chamber with the cylinder section, a pair of passages in the sleeve connecting said ports with a bore in the sleeve and an opposed passage in the sleeve connecting the bore with said fluid passage, a pilot valve slidable in said bore to selectively connect one of said ports with the opposed passage and fluid passage to control the position of the piston member attached thereto and sleeve valve for controlling the output volume of the pump and the speed of the motor, said pilot valve having a pair of spaced lands which block the pair of passages when said pilot valve is in a neutral position, and means responsive to a speed signal from the motor for positioning the pilot valve.

2. A hydraulic transmission, comprising, in combination, a motor, a variable volume, vane-type pump having an adjustable pressure ring, a fluid connection between the pump and motor, a source of fluid under pressure, a member engageable with the pressure ring to determine the position thereof, a housing attached to the pump having a chamber and a coaxial cylinder section adjacent the ring, a piston connected to said member and slidable in the cylinder section, a sleeve valve connected to the piston and slidable in said chamber, a fluid pressure port and a drain port formed in the housing and communicating with said chamber, a fluid passage in the housing connecting the chamber with the cylinder section, a pair of passages in the sleeve connecting said ports with a bore in the sleeve and an opposed passage in the sleeve connecting the bore with said fluid passage, a pilot valve slidable in said bore to selectively connect one of said ports with the opposed passage and fluid passage to control the position of the piston member attached thereto and sleeve valve, and means responsive to a speed signal from the motor for positioning the pilot valve.

3. A hydraulic transmission comprising, in combination, a motor, a variable volume pump including a rotor carrying slidably mounted vanes and a pressure ring for controlling the extent of sliding movement of the vanes adjustable between different positions of eccentricity relative to the rotor so as to vary the output volume of the pump, a fluid connection between the pump and the motor, a member engageable with the ring, a source of operating fluid under pressure, a cylinder having ports at opposite ends thereof, a piston movable in said cylinder and carrying said member, a four-way valve having a pair of ports connected to the cylinder ports, a pressure port intermediate said pair of ports, a drain port connecting to drain chambers beyond said pair of ports and a valve member having a central land and spaced end lands, said central land being positioned to partially block said pressure port and said end lands blocking said drain port when said valve member is in neutral position, and means responsive to a speed signal from the motor for shifting the valve member from neutral position to move the piston by connecting the pressure port to one of said cylinder ports and the other cylinder port to drain and for subsequently maintaining the position of the piston by returning the valve member to neutral, said last-mentioned means including a pilot valve effective to create a pressure differential in operating fluid exposed against the ends of said end lands.

4. A hydraulic transmission comprising, in combination, a motor, a variable volume pump including a rotor carrying slidably mounted vanes and a pressure ring for controlling the extent of sliding movement of the vanes adjustable between different positions of eccentricity relative to the rotor so as to vary the output volume of the pump, a member engageable with the ring in position to oppose the pumping action of the pump, a source of operating fluid under pressure, a cylinder having a piston for positioning the member, a four-way valve connected to the cylinder for directing fluid to one end or the other thereof to shift and maintain the position of said piston and said member, a pilot valve connected to operate the four-way valve, a fluid connection between the pump and motor and means receiving a speed signal from the motor for controlling the position of the pilot valve.

5. In a hydraulic transmission, in combination, a motor, a variable volume pump including a shiftable device for varying the output volume of the pump, a fluid connection between the pump and motor, a source of operating fluid under pressure, a member in engagement with the shiftable device in opposing relation to the force of pumping action in said pump, a cylinder having a movable piston for positioning the member, a valve including a valve member connected to the cylinder for selectively directing said fluid to said piston, a pilot valve connected to operate the first-mentioned valve, and means responsive to a speed signal from the motor for positioning the pilot valve.

References Cited in the file of this patent
UNITED STATES PATENTS

| | | |
|---|---|---|
| 2,069,230 | Ferris | Feb. 2, 1937 |
| 2,198,035 | Ferris | Apr. 23, 1940 |
| 2,255,783 | Kendrick | Sept. 16, 1941 |
| 2,581,149 | Shaw | Jan. 1, 1952 |
| 2,612,114 | Ernst | Sept. 30, 1952 |
| 2,654,999 | Berge | Oct. 13, 1953 |
| 2,716,946 | Hardy | Sept. 6, 1955 |
| 2,764,365 | Davis et al. | Sept. 25, 1956 |